(12) United States Patent
Sakamoto et al.

(10) Patent No.: US 6,783,892 B2
(45) Date of Patent: Aug. 31, 2004

(54) POSITIVE ELECTRODE ACTIVE MATERIAL FOR ALKALINE STORAGE BATTERIES, AND POSITIVE ELECTRODE AND ALKALINE STORAGE BATTERY USING THE SAME

(75) Inventors: Hiroyuki Sakamoto, Katano (JP); Hidekatsu Izumi, Katano (JP); Toru Inagaki, Kamakura (JP); Yoichi Izumi, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 272 days.

(21) Appl. No.: 10/040,184

(22) Filed: Jan. 4, 2002

(65) Prior Publication Data

US 2002/0098415 A1 Jul. 25, 2002

Related U.S. Application Data

(63) Continuation of application No. PCT/JP01/04242, filed on May 21, 2001.

(30) Foreign Application Priority Data

Jun. 16, 2000 (JP) ....................................... 2000-181104
Jun. 20, 2000 (JP) ....................................... 2000-184177

(51) Int. Cl.[7] ................................................. H01M 4/32
(52) U.S. Cl. ..................................... 429/223; 429/231.5
(58) Field of Search ........................................ 429/223

(56) References Cited

U.S. PATENT DOCUMENTS 5,700,596 A * 12/1997 Ikoma et al. ............... 429/206
6,077,496 A * 6/2000 Ito et al. ................... 423/594.2
6,416,903 B1 * 7/2002 Fierro et al. ................ 429/223
6,447,953 B1 * 9/2002 Fierro et al. ................ 429/223

FOREIGN PATENT DOCUMENTS

| JP | 02109261 A | | 4/1990 | |
|---|---|---|---|---|
| JP | 05021064 A | | 1/1993 | |
| JP | 05041212 A | | 2/1993 | |
| JP | 05182662 A | | 7/1993 | |
| JP | 05182663 A | | 7/1993 | |
| JP | 07094182 A | | 4/1995 | |
| JP | 10149821 A | | 6/1998 | |
| JP | 11149924 A | | 6/1999 | |
| JP | 11219703 A | | 8/1999 | |
| JP | 11-219703 | * | 8/1999 | ............ H01M/4/52 |
| JP | 11238509 A | | 8/1999 | |
| JP | 11-238509 | * | 8/1999 | ............ H01M/4/52 |

* cited by examiner

Primary Examiner—Mark Ruthkosky
(74) Attorney, Agent, or Firm—Akin Gump Strauss Hauer & Feld, L.L.P.

(57) ABSTRACT

In order to provide a positive electrode active material capable of producing an alkaline storage battery having a high discharge voltage and an excellent discharge characteristic and also provide a positive electrode and alkaline storage battery containing thereof, a positive electrode active material for an alkaline storage battery comprising a nickel hydroxide powder is used, in which the nickel hydroxide is a solid solution containing magnesium, the magnesium content in the nickel hydroxide is 2 to 7 mol % of all metallic elements contained in the nickel hydroxide, the tap density of the nickel hydroxide is 1.9 g/cm$^3$ or more, the half-width of a peak attributed to (101) face near $2\theta=37$ to 40° in a powder X-ray diffraction pattern of the nickel hydroxide by CuKα radiation is 0.7 to 1.2° and the sulfate ion content in the nickel hydroxide is 0.5 wt % or less.

8 Claims, 6 Drawing Sheets

POSITIVE ELECTRODE ACTIVE MATERIAL FOR ALKALINE STORAGE BATTERIES, AND POSITIVE ELECTRODE AND ALKALINE STORAGE BATTERY USING THE SAME

CROSS-REFERENCE TO RELATED APPLICATION

This application is a continuation of International Application No. PCT/JP01/04242, filed May 21, 2001, the disclosure of which is incorporated herein by reference.

TECHNICAL FIELD

The present invention relates to a positive electrode active material for alkaline storage batteries, and also a positive electrode and alkaline storage battery using thereof.

BACKGROUND ART

In recent years, the capacity density of a positive electrode for an alkaline storage battery has been significantly increased by improvements of the substrate shape, active material shape, active material composition and additives. At present, a positive electrode having a capacity density of around 600 mAh/cc has been put into practical application.

However, equipments using an alkaline storage battery as a power source demand further improvements of the high-rate discharge characteristic and output.

In order to improve the high-rate discharge characteristic, conventionally, there have been considered a method of improving the current collecting efficiency of the electrode; a method of lowering the resistance of the electrode; and a method of improving the charge/discharge efficiency of the active material.

Moreover, modification of nickel hydroxide has been carried out by replacing Ni in the nickel hydroxide with metal elements other than Ni.

Application to the electrode material of nickel hydroxide in the state of a solid solution containing a small amount of magnesium has been studied because of its high discharge potential. The battery output is significantly improved when discharge potential shifts in a higher direction (noble direction). Further, when the nickel hydroxide in the state of a solid solution containing a small amount of magnesium is used as a positive electrode active material, since the formation of γ-NiOOH is limited, the cycle life of the battery is improved.

As the nickel hydroxide in the state of a solid solution containing a small amount of magnesium, the following have been proposed.

(1) Japanese Laid-Open Patent Publication No. Hei 2-109261 (1990) proposes nickel hydroxide in the state of a solid solution containing 1 to 3 wt % of magnesium, wherein the inner pore radius is 30 Å or less and the total pore volume is 0.05 ml/g or less. The purposes of this proposal are to increase the density of nickel hydroxide and provide an active material having a long life and a high utilization rate.

(2) Japanese Laid-Open Patent Publication No. Hei 5-21064 (1993) proposes nickel hydroxide in the state of a solid solution containing 1 to 7 wt % of magnesium or the like, comprising a mixture of spherical or substantially spherical particles and non-spherical particles. The purpose of this proposal is to increase the nickel hydroxide content in the positive electrode.

(3) Japanese Laid-Open Patent Publication No. Hei 5-41212 (1993) proposes nickel hydroxide in the state of a solid solution containing 1 to 7 wt % of magnesium or the like, wherein a myriad of primary particles of not larger than 0.1 μm gather and the volume of pores with a pore diameter of 30 Å or more is 20 to 70% of the total void volume. The purpose of this proposal is to facilitate infiltration of an electrolyte into the particles, thereby limiting the formation of γ-NiOOH due to uneven distribution of the electrolyte in the particles and improving the utilization rate of the active material at an early stage of charge/discharge.

(4) Japanese Laid-Open Patent Publication No. Hei 5-182662 (1993) proposes nickel hydroxide in the state of a solid solution obtained by replacing a part of Ni with other element, wherein the inner pore volume is 0.14 ml/g or less. As the other element, Zn, Mg, Cd or Ba is used because they do not impair the characteristic of nickel hydroxide as an active material. The purpose of this proposal is to replace a part of Ni in high-density nickel hydroxide with an element such as magnesium so as to form a defect in the crystal lattice of the nickel hydroxide, thereby increasing the degree of freedom of proton transfer and limiting the formation of γ-NiOOH.

(5) Japanese Laid-Open Patent Publication No. Hei 5-182663 (1993) proposes nickel hydroxide in the state of a solid solution in which a part of Ni is replaced with Co and other element, and the inner pore volume is 0.14 ml/g. As the other element, Zn, Mg, Cd or Ba is used. The purpose of this proposal is to improve the charge efficiency at high temperatures by replacing a part of Ni in the nickel hydroxide with a predetermined element.

(6) Japanese Laid-Open Patent Publication No. Hei 11-219703 (1999) proposes to form a coating layer comprising a cobalt compound containing sodium, on the surface of nickel hydroxide in the state of a solid solution containing 0.5 to 5 wt % of magnesium and to contain 0.05 to 5.0 wt % of yttrium based on Ni in the nickel hydroxide in a non-sintered type nickel positive electrode. The purpose of this proposal is to improve the charge acceptance.

Here, when a solid solution is formed by incorporating magnesium into nickel hydroxide, since a nickel sulfate or the like is used as a starting material, sulfate ions are absorbed into the crystals of the nickel hydroxide and the crystal structure is likely to be disordered. Besides, when the crystal structure of the nickel hydroxide is disordered, the polarization during high-rate discharge increases, resulting in a problem that the conductivity also decreases considerably. Accordingly, during high-rate discharge, the utilization rate of nickel hydroxide tends to be lower. It would be considered that the increase of polarization during high-rate discharge due to the disordered crystal structure of the nickel hydroxide is caused by a decrease in the degree of freedom of proton transfer.

However, all of the above proposals (1) through (6) aim for an improvement of the cycle life or the charge/discharge efficiency and do not disclose means for solving the problem of the insufficient high-rate discharge characteristic. Therefore, even if batteries are manufactured according to the above proposals, sufficient high-rate discharge characteristics are not obtained.

Moreover, the nickel hydroxide in the state of a solid solution containing magnesium has a problem of lower charge efficiency at high temperatures.

Although the above proposal (5) discloses a technique of improving the charge efficiency at high temperatures, it does not solve the problem of the insufficient high-rate discharge characteristic.

In other words, it is difficult to obtain batteries having sufficient high-rate discharge characteristics and an excellent charge efficiency at high temperatures.

DISCLOSURE OF INVENTION

An object of the present invention is to provide a positive electrode active material for producing an alkaline storage battery with a high discharge voltage and an excellent high-rate discharge characteristic, and a positive electrode and an alkaline storage battery using the positive electrode active material.

Another object of the present invention is to provide a positive electrode active material for producing an alkaline storage battery with a high discharge voltage, an excellent high-rate discharge characteristic and excellent charge efficiency at high temperatures, and provide a positive electrode and an alkaline storage battery using the positive electrode active material.

In order to achieve the above objects, the present invention relates to a positive electrode active material for an alkaline storage battery comprising a nickel hydroxide powder, wherein the nickel hydroxide is a solid solution containing magnesium, the magnesium content in the nickel hydroxide is 2 to 7 mol % of all metallic elements contained in the nickel hydroxide, the tap density of the nickel hydroxide is 1.9 g/cm$^3$ or more, the half-width of a peak attributed to (101) face near 2θ=37 to 40° in a powder X-ray diffraction pattern of the nickel hydroxide by CuKα ray radiation is 0.7 to 1.2°, and the sulfate ion content in the nickel hydroxide is 0.5 wt % or less.

Here, in the powder X-ray diffraction pattern of the nickel hydroxide by CuKα ray radiation, the ratio of intensity B of a peak attributed to (001) face near 2θ=18 to 21° to intensity A of the peak attributed to (101) face near 2θ=37 to 40°: B/A is preferably 1.1 or more.

It is preferred that the nickel hydroxide further contains at least one element selected from the group consisting of cobalt and manganese.

It is preferred that the content of the at least one element selected from the group consisting of cobalt and manganese in the nickel hydroxide is 0.5 to 3 mol % of all metallic elements in the nickel hydroxide.

It is preferred that the surface of the nickel hydroxide is coated with an oxide of cobalt.

The average valence number of cobalt contained in the oxide of cobalt is preferably larger than 3.

The present invention also relates to a positive electrode for an alkaline storage battery, containing a positive electrode active material of the present invention. With the use of a positive electrode containing an active material of the present invention, it is possible to obtain an alkaline storage battery having an excellent discharge voltage and high-rate discharge characteristic.

It is preferred that the positive electrode of the present invention further contains a powder comprising an oxide of at least one element selected from the group consisting of Y, Yb, Lu, Ti and Ca. The content of the powder comprising the oxide in the positive electrode is preferably 0.5 to 3 parts by weight per 100 parts by weight of the positive electrode active material of the present invention for an alkaline storage battery.

The present invention further relates to an alkaline storage battery comprising a positive electrode of the present invention for an alkaline storage battery; a negative electrode; and an alkaline electrolyte.

Here, the alkaline electrolyte preferably contains sodium hydroxide.

The concentration of the sodium hydroxide in the alkaline electrolyte is preferably 1 to 5 mol/liter.

BEST MODE FOR CARRYING OUT THE INVENTION

Figure 1:
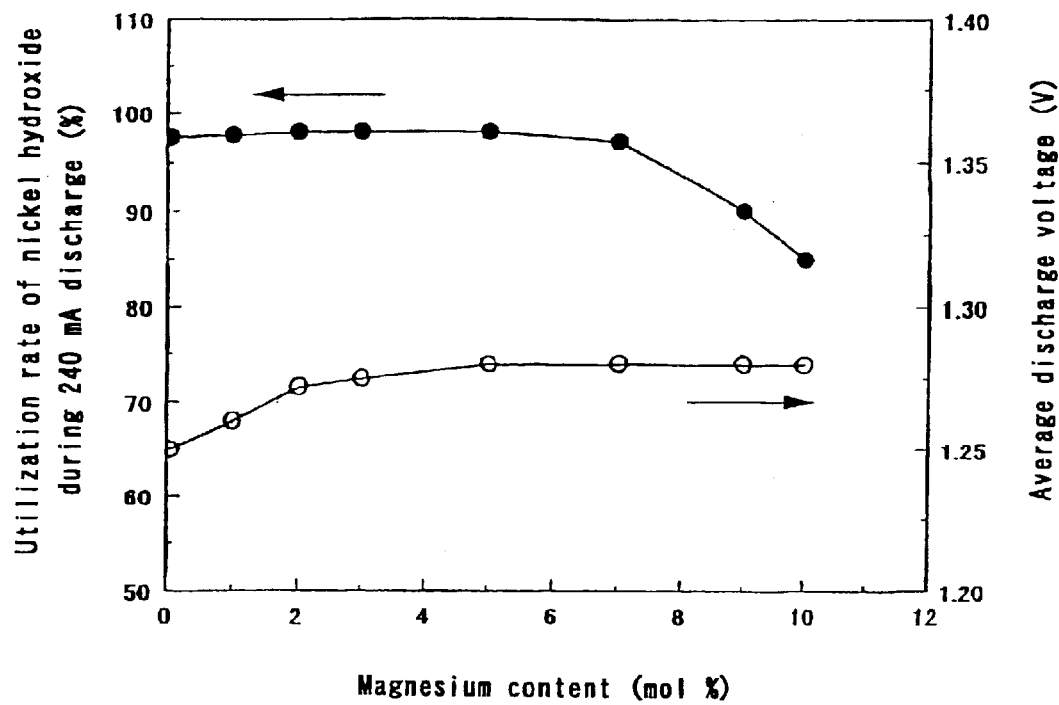
FIG. 1 shows the relationship, obtained in Example 1, between the magnesium content indicated by the ratio of the amount of magnesium to the total amount of nickel and magnesium in the nickel hydroxide and the utilization rate of nickel hydroxide during 240 mA discharge or average discharge voltage.

When nickel hydroxide in the state of a solid solution incorporating Mg therein, i.e., a solid solution obtained by replacing a part of Ni in nickel hydroxide with Mg, is used as an active material, the discharge potential becomes higher, and therefore it is possible to obtain high-output batteries to some extent. However, when the amount of magnesium is less than 2 molt of all metallic elements contained in the nickel hydroxide in the state of a solid solution, the effect of increasing the discharge potential is not sufficiently exhibited. Moreover, when the amount of magnesium is more than 7 molt of all metallic elements contained in the nickel hydroxide, the utilization rate of nickel hydroxide is lowered even in low-rate discharge. Further, since the amount of nickel in the nickel hydroxide decreases, a sufficient battery capacity is not obtained.

Therefore, in order to achieve a significant improvement of output, it is necessary to optimize the physical properties of nickel hydroxide in the state of a solid solution in the following manner.

The tap density of the nickel hydroxide is preferably 1.9 g/cm$^3$ or more, and more preferably 2.1 g/cm$^3$ or more. When the tap density is lower than 1.9 g/cm$^3$, the filled amount of the nickel hydroxide into the positive electrode decreases and it becomes difficult to obtain a positive electrode with a high energy density.

The half-width of a peak attributed to (101) face near $2\theta=37$ to $40°$ in a powder X-ray diffraction pattern of the nickel hydroxide by CuK$\alpha$ ray radiation is preferably 0.7 to 1.2. Within this range, even when some sulfate ions are absorbed into the crystal structure of the nickel hydroxide, the structure is hardly disordered, and therefore the degree of freedom of proton transfer is not lowered.

Even when the nickel hydroxide satisfies these conditions, if the sulfate ion content in the nickel hydroxide is too large, the crystal structure is disordered with repetition of the charge/discharge cycle. When the crystal structure of the nickel hydroxide is disordered, the polarization during high-rate discharge increases and a sufficient output is not obtained. Accordingly, the sulfate ion content in the nickel hydroxide solid solution needs to be limited to 0.5 wt % or less.

However, in the present invention, since the crystal structure of the nickel hydroxide is optimized to some extent, it is not necessary to significantly lower the sulfate ion content. The amount of sulfate ions needs to be set slightly lower than that in conventional nickel hydroxide in the state of a solid solution containing magnesium. Even with such a slight difference, the high-rate discharge characteristic is significantly improved.

In the nickel hydroxide, the ratio of intensity B of a peak attributed to (001) face near $2\theta=18$ to $21°$ to intensity A of a peak attributed to (101) face near $2\theta=37$ to $40°$: B/A in a powder X-ray diffraction pattern of the nickel hydroxide by CuK$\alpha$ ray radiation is preferably 1.1 or more.

When the peak intensity ratio B/A is 1.1 or more, the orientation in the C-axis direction of the crystals of nickel hydroxide increases. This indicates that the crystals are growing in the crystal face direction and the crystals are more homogeneous in that direction.

When the crystals are homogeneous in the crystal face direction, the degree of freedom of proton transfer is improved. Moreover, it is considered that the polarization during high-rate discharge is limited and the high-rate discharge characteristic is further improved.

In the nickel hydroxide in the state of a solid solution containing magnesium, a part of Ni may further be replaced with at least one element selected from the group consisting of cobalt and manganese. Since cobalt and manganese tend to have a valence number larger than 2, they remain with a high valence number even at a final stage of discharge. Therefore, cobalt and manganese have the effects of increasing the degree of freedom of proton transfer at the final stage of discharge and improving the utilization rate during low-rate discharge.

The amount of at least one element selected from the group consisting of cobalt and manganese, contained in the nickel hydroxide, is preferably 0.5 to 3 molt of all metallic elements in the nickel hydroxide. When their total content is less than 0.5 molt, the above-mentioned effects are reduced, while when the content is more than 3 molt, the discharge voltage is lowered and therefore the effects of magnesium are cancelled.

The surface of the nickel hydroxide is preferably coated with an oxide of cobalt functioning as a conductive agent. In this case, with the use of a small amount of the oxide of cobalt, it is possible to significantly improve the conductivity of the nickel hydroxide and further improve the high-rate discharge characteristic. It is preferable to coat substantially the entire particle surface of the nickel hydroxide with the oxide of cobalt, but it is effective to coat a part thereof.

The average valence number of cobalt contained in the oxide of cobalt is preferably larger than 3 because an excellent conductivity is obtained when it is larger than 3.

For the oxide of cobalt, it is possible to use cobalt oxide, cobalt hydroxide, cobalt oxyhydroxide, etc.

By not only optimizing the positive electrode active material, but also applying the following technique to the positive electrode, it is possible to simultaneously improve the charge efficiency at high temperatures in addition to the high-rate discharge characteristic.

Specifically, it is preferred to arrange a positive electrode containing the above-mentioned positive electrode active material to further contain a powder comprising an oxide of at least one element selected from the group consisting of Y, Yb, Lu, Ti and Ca. The oxides of these metallic elements may be used alone or by combining two or more kinds thereof. Moreover, a composite oxide containing two or more kinds of metallic elements may be used. These metal oxides have the effects of increasing the overvoltage for release of oxygen at the final stage of charge and improving the charge efficiency at high temperatures.

The amount of the oxide contained in the positive electrode is preferably 0.5 to 3 parts by weight per 100 parts by weight of the positive electrode active material. When the amount of the oxide is less than 0.5 part by weight, the overvoltage for release of oxygen is hardly increased. On the other hand, when the amount is more than 3 parts by weight, the discharge reaction is disturbed, resulting in degradation of the high-rate discharge characteristic.

An alkaline electrolyte for use in an alkaline storage battery preferably contains sodium hydroxide. With the use of an alkaline electrolyte containing sodium hydroxide, it is possible to significantly increase the overvoltage for release of oxygen at the final stage of discharge and greatly improve the charge efficiency at high temperatures.

The concentration of the sodium hydroxide in the alkaline electrolyte is preferably 1 to 5 mol/liter. When the concentration of the sodium hydroxide is less than 1 mol/liter, the overvoltage for release of oxygen is hardly increased. On the other hand, when the concentration of the sodium hydroxide is more than 5 mol/liter, the utilization rate of nickel hydroxide during high-rate discharge is lowered.

As a negative electrode for use in an alkaline storage battery of the present invention, a negative electrode comprising a hydrogen storage alloy; a negative electrode comprising cadmium; etc. are usable, but the present invention is not limited to them.

Next, the present invention will be explained in detail based on some examples.

EXAMPLE 1

First, a process of synthesizing a nickel hydroxide powder in the state of a solid solution incorporating magnesium therein will be explained.

(i) Step 1

An aqueous solution containing nickel sulfate and magnesium sulfate, an aqueous sodium hydroxide solution and an aqueous ammonia solution were prepared. Each of them was continuously supplied into a reaction apparatus maintained at 40° C. at a flow rate of 0.5 ml/minute.

Here, the total nickel sulfate and magnesium sulfate concentration in the aqueous solution containing nickel sulfate and magnesium sulfate was made 2.4 mol/liter. In this aqueous solution, the ratio of the amount of magnesium ions to the total amount of nickel ions and magnesium ions was made 0.5 to 10 mol %. Moreover, the concentration of the aqueous ammonia solution was made 5 mol/liter, and the concentration of the aqueous sodium hydroxide solution was also made 5 mol/liter.

When a steady state was achieved where the pH in the reaction apparatus and the concentration balance of the metallic salts and the hydroxide produced were constant, an overflowed suspension containing the hydroxide was sampled. At this time, the pH in the reaction apparatus was 11.7. Then, the hydroxide was separated by decantation.

(ii) Step 2

The obtained hydroxide was subjected to an alkali treatment by immersing it in an aqueous sodium hydroxide solution of a pH between 13 and 14 to remove anions such as sulfate ions in the hydroxide particles, and then washed with water and dried. In this manner, nickel hydroxide powders in the state of a solid solution with an average particle size of 10 μm were obtained.

Here, it is possible to control the sulfate ion content in the hydroxide particle by the time and number of times of the alkali treatment. In this example, in order to reduce the sulfate ion content, the alkali treatment was repeated three times or more with the aqueous sodium hydroxide solution at a relatively high temperature of 60° C.

The obtained nickel hydroxide powders were analyzed, and the following results were obtained.

The ratios of the amount of magnesium to the total amount of nickel and magnesium in the nickel hydroxides were 0.5 to 10 mol % like the aqueous solution as the starting material.

The sulfate ion contents in the nickel hydroxides were $0.3 \pm 0.01$ wt %.

The powder X-ray diffraction patterns of the nickel hydroxides by CuKα radiation all exhibited a β-Ni(OH)$_2$ type single phase pattern. It was thus confirmed that a magnesium element dissolved in the crystal of the nickel hydroxides and solid solutions were formed.

The half-widths of a peak attributed to (101) face near $2\theta = 37$ to $40°$ C. in the patterns were $0.9 \pm 0.02°$.

The tap densities of the nickel hydroxides were all 0.9 g/cm$^3$ or more, and it was confirmed that the nickel hydroxides were materials suitable for obtaining a positive electrode having a high energy density.

Next, a process of fabricating a nickel positive electrode will be explained.

10 g of cobalt hydroxide powder and 30 g of water were added to 100 g of the obtained nickel hydroxide powder and kneaded to obtain a paste. A nickel foam substrate with a porosity of 95% was filled with this paste, dried and pressed so as to obtain an electrode plate.

This electrode plate was cut and provided with an electrode lead by spot welding so as to obtain a nickel positive electrode with a theoretical capacity of 1200 mAh. However, the capacity shown here was calculated by assuming that the nickel in the nickel hydroxide makes a one-electron reaction.

Next, a process of fabricating an alkaline storage battery will be explained.

For the negative electrode, a known negative electrode for alkaline storage batteries, that is, a negative electrode comprising a powder of hydrogen storage alloy: MmNi$_{3.55}$Co$_{0.75}$Mn$_{0.4}$Al$_{0.3}$ with an average particle size of about 30 μm was used.

Water and carboxymethyl cellulose as a binding agent were added to the hydrogen storage alloy and kneaded to obtain a paste. An electrode substrate was filled with this paste under application of pressure so as to obtain an electrode plate. This electrode plate was cut to obtain a negative electrode with a capacity of 1920 mAh.

The positive electrode and the negative electrode were spirally wound with a 0.15 mm thick separator comprising a sulfonated polypropylene non-woven fabric therebetween so as to obtain an electrode group. This electrode group was inserted into a battery case, and further 2.2 ml of a 7 mol/liter aqueous potassium hydroxide solution was pored therein. Thereafter, the opening of the battery case was sealed with a sealing plate having a safety valve of a working pressure of about 2.0 MPa, thereby obtaining a cylindrical sealed type nickel hydroxide storage battery of AA size.

Next, the characteristics of the obtained battery were evaluated.

A charge/discharge cycle of: charging the battery by a current of 120 mA for 15 hours at 20° C. and discharging it by a current of 240 mA until the battery voltage reached 1.0 V was repeated. Then, after the discharge capacity was stabilized, the average discharge voltage and the utilization rate of nickel hydroxide were calculated. The utilization rate of nickel hydroxide was calculated as the ratio to the theoretical quantity of electricity obtained by assuming that the nickel in the nickel hydroxide makes a one-electron reaction.

FIG. 1 shows the relationship between the magnesium content indicated by the ratio of the amount of magnesium to the total amount of nickel and magnesium in the nickel hydroxide and the utilization rate of nickel hydroxide during 240 mA discharge or average discharge voltage.

In FIG. 1, when the magnesium content was 2 mol % or more, a high average discharge voltage was obtained. Whereas when the magnesium content was more than 7 mol %, the utilization rate of nickel hydroxide was lowered. Accordingly, an appropriate ratio of the amount of magnesium to the total amount of nickel and magnesium in the nickel hydroxide is 2 to 7 mol %.

EXAMPLE 2

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol % and the concentration of the aqueous sodium hydroxide solution was made 4.2 to 6 mol/liter. The crystallinity of the hydroxide can be changed by the concentration of the aqueous sodium hydroxide solution. Since the concentration of the aqueous sodium hydroxide solution was varied, the pH value in a reaction vessel in a steady state was between 11 and 12.5.

Thereafter, the same operation as in Example 1 was carried out so as to obtain nickel hydroxide powders in the state of a solid solution with an average particle size of 10 μm.

The obtained nickel hydroxide powders were analyzed, and the following results were obtained.

The ratios of the amount of magnesium to the total amount of nickel and magnesium in the nickel hydroxides were 5 mol %.

The sulfate ion contents in the nickel hydroxides were 0.3±0.01 wt %.

The powder X-ray diffraction patterns of the nickel hydroxides by CuKα radiation all exhibited a β-Ni(OH)$_2$ type single phase pattern.

The half-widths of a peak attributed to (101) face near 2θ=37 to 40° in the patterns were 0.63 to 1.31°.

The tap densities of the nickel hydroxides were all 1.9 g/cm$^3$ or more.

With the use of the nickel hydroxide powders with the different half-widths as the positive electrode active materials, batteries similar to that of Example 1 were fabricated.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, utilization rate A of nickel hydroxide was calculated.

Moreover, a charge/discharge cycle of: charging the battery by a current of 120 mA for 15 hours and discharging it by a current of 3600 mA until the battery voltage reached 1.0 V was repeated. Then, after the discharge capacity was stabilized, utilization rate B of nickel hydroxide was calculated.

Figure 2:
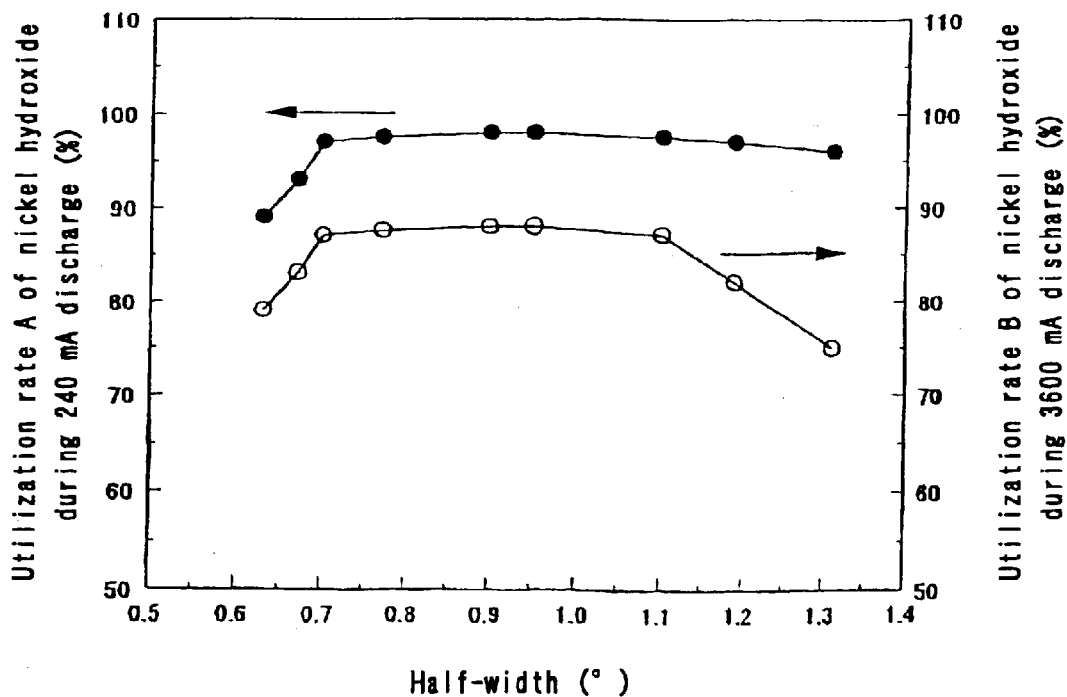
FIG. 2 shows the relationship, obtained in Example 2, between the half-width of a peak attributed to (101) face near 2θ=37 to 40° in a powder X-ray diffraction pattern of the nickel hydroxide by CuKα ray radiation and utilization rate A of nickel hydroxide during 240 mA discharge and utilization rate B of nickel hydroxide during 3600 mA discharge.

FIG. 2 shows the relationship between the half-width of the peak attributed to (101) face and the utilization rate A of nickel hydroxide during 240 mA discharge or utilization rate B of nickel hydroxide during 3600 mA discharge.

In FIG. 2, when the half-width was 0.7 or more, a high utilization rate of nickel hydroxide was obtained during 240 mA low-rate discharge. Furthermore, when the half-width was 1.2° or less, a high utilization rate of nickel hydroxide was obtained during 3600 mA high-rate discharge. Accordingly, in order to improve the utilization rate and high-rate discharge characteristic of the active material, it is effective to control the half-width to be 0.7 to 1.2°.

EXAMPLE 3

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol %.

Moreover, the same operation as in Step 2 of Example 1 was carried out except that the time and the number of repetition of the alkali treatment were changed, so that nickel hydroxide powders in the state of a solid solution with an average particle size of 10 μm were obtained.

The obtained nickel hydroxide powders were analyzed, and the following results were obtained.

The ratios of the amount of magnesium to the total amount of nickel and magnesium in the nickel hydroxides were 5 mol %.

The sulfate ion contents in the nickel hydroxides were 0.05 to 1.0 wt %.

The powder X-ray diffraction patterns of the nickel hydroxides by CuKα radiation all exhibited a β-Ni(OH)$_2$ type single phase pattern.

The half-widths of a peak attributed to (101) face near 2θ=37 to 40° in the patterns were 0.9±0.1°.

The tap densities of the nickel hydroxides were all 1.9 g/cm$^3$ or more.

With the use of the nickel hydroxide powders with the different sulfate ion contents as the positive electrode active materials, batteries similar to that of Example 1 were fabricated.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours and discharged by a current of 3600 mA until the battery voltage reached 1.0 V. Based on the resultant discharge capacity, the utilization rate of nickel hydroxide during 3600 mA high-rate discharge was calculated.

Figure 3:
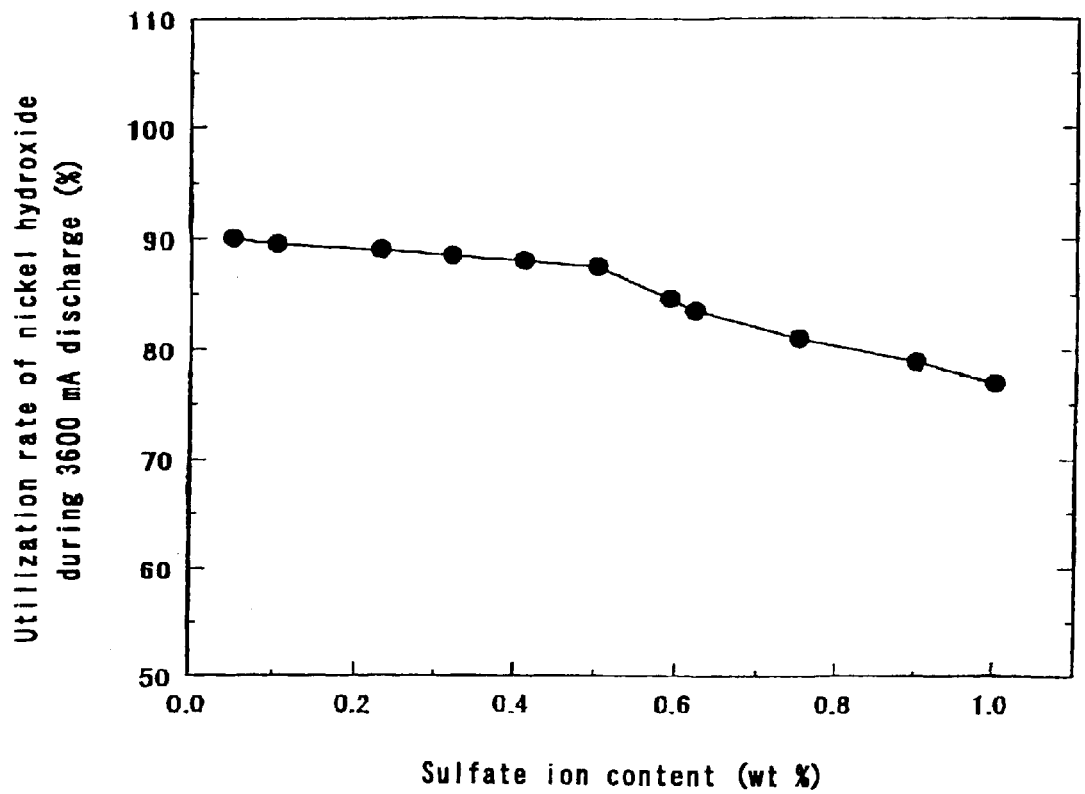
FIG. 3 shows the relationship, obtained in Example 3, between the sulfate ion content in the nickel hydroxide and the utilization rate of nickel hydroxide during 3600 mA discharge.

FIG. 3 shows the relationship between the sulfate ion content in nickel hydroxide and the utilization rate of nickel hydroxide during 3600 mA discharge.

In FIG. 3, when the sulfate ion content was 0.5 wt % or less, a high utilization rate of nickel hydroxide was obtained. Besides, when the sulfate ion content was more than 0.5 wt %, the utilization rate of nickel hydroxide was abruptly lowered. Accordingly, in order to improve the high-rate discharge characteristic, it is extremely important to make the content of sulfate ions in the nickel hydroxide 0.5 wt % or less.

EXAMPLE 4

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol % and the temperature in the reaction apparatus was changed to 20 to 70° C. It is possible to change the orientation of the crystals of hydroxide by changing the temperature in the reaction apparatus.

Thereafter, the same operation as in Example 1 was carried out so as to obtain nickel hydroxide powders in the state of a solid solution with an average particle size of 10 μm.

The obtained nickel hydroxide powders were analyzed, and the following results were obtained.

The ratios of the amount of magnesium to the total amount of nickel and magnesium in the nickel hydroxides were 5 mol %.

The sulfate ion contents in the nickel hydroxides were 0.3±0.01 wt %.

The powder X-ray diffraction patterns of the nickel hydroxides by CuKα radiation all exhibited a β-Ni(OH)$_2$ type single phase pattern.

The half-widths of a peak attributed to (101) face near 2θ=37 to 40° in the patterns were 0.9±0.1°.

The ratios of intensity B of a peak attributed to (001) face near 2θ=18 to 21° to intensity A of a peak attributed to (101) face near 2θ=37 to 40°: B/A in the patterns were 1.0 to 1.3.

The tap densities of the nickel hydroxides were all 1.9 g/cm$^3$ or more.

With the use of nickel hydroxide powders with the different peak intensity ratios: B/A as the positive electrode active materials, batteries similar to that of Example 1 were fabricated.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours and discharged by a current of 3600 mA until the battery voltage reached 1.0 V. Based on the resultant discharge capacity, the utilization rate of nickel hydroxide during 3600 mA discharge was calculated.

Figure 4:
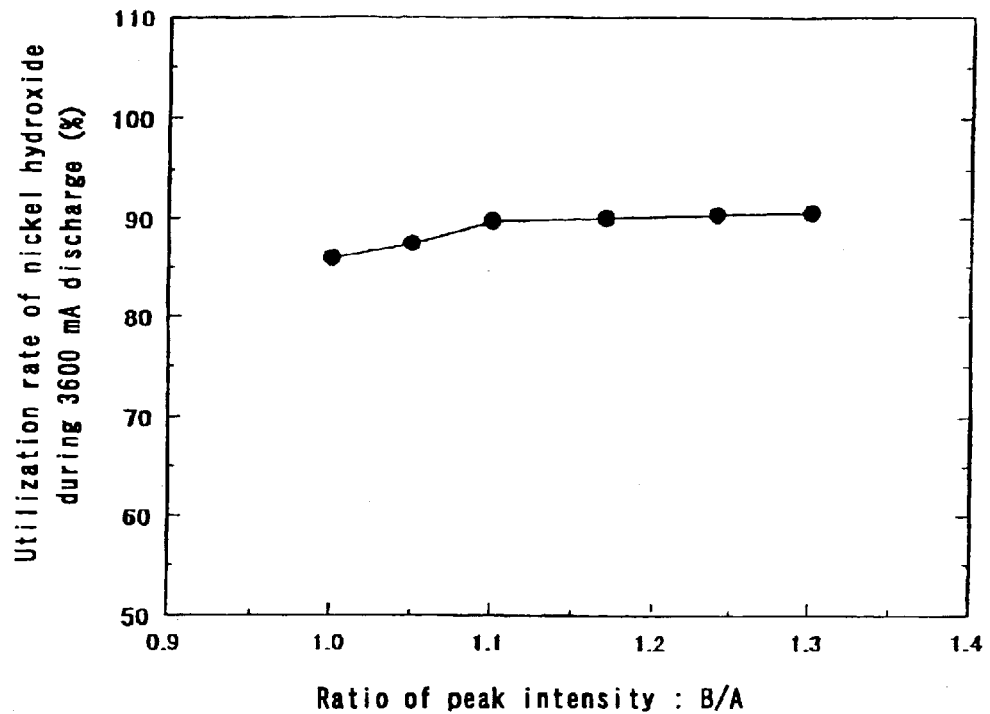
FIG. 4 shows the relationship, obtained in Example 4, between the ratio of intensity B of a peak attributed to (001) face near 2θ=18 to 21° to intensity A of a peak attributed to (101) face near 2θ=37 to 40° in a powder X-ray diffraction pattern of nickel hydroxide by CuKα ray radiation: B/A and the utilization rate of nickel hydroxide during 3600 mA discharge.

FIG. 4 shows the relationship between the peak intensity ratio: B/A and the utilization rate of nickel hydroxide during 3600 mA high-rate discharge.

In FIG. 4, a high utilization rate of nickel hydroxide was obtained when the value of B/A was 1.1 or more. Accordingly, in order to further improve the high-rate discharge characteristic, it is effective to control the peak intensity ratio: B/A to be 1.1 or more.

EXAMPLE 5

The same operation as in Step 1 of Example 1 was carried out except that the aqueous solution containing nickel sulfate and magnesium sulfate further contained cobalt sulfate or manganese sulfate, the ratio of the amount of magnesium ions and the ratio of cobalt or manganese ions to the total amount of nickel ions, magnesium ions and cobalt or manganese ions were made 5 mol % and 0 to 4 mol %, respectively.

Thereafter, the same operation as in Example 1 was carried out so as to obtain nickel hydroxide powders in the state of a solid solution with an average particle size of 10 μm.

The obtained nickel hydroxide powders were analyzed, and the following results were obtained.

The ratios of the amount of magnesium to the total amount of nickel, magnesium and cobalt or manganese in the nickel hydroxides were 5 mol %.

The ratios of the amount of cobalt or manganese to the total amount of nickel, magnesium and cobalt or manganese were 0 to 4 mol %.

The sulfate ion contents in the nickel hydroxides were 0.3±0.01 wt %.

The powder X-ray diffraction patterns of the nickel hydroxides by CuKα radiation all exhibited a β-Ni(OH)$_2$ type single phase pattern.

The half-widths of a peak attributed to (101) face near 2θ=37 to 40° in the patterns were 0.9±0.05°.

The tap densities of the nickel hydroxides were all 1.9 g/cm$^3$ or more.

With the use of the nickel hydroxide powders containing cobalt or manganese in different ratios as the positive electrode active materials, batteries similar to that of Example 1 were fabricated.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the average discharge voltage and the utilization rate of nickel hydroxide were calculated.

Figure 5:
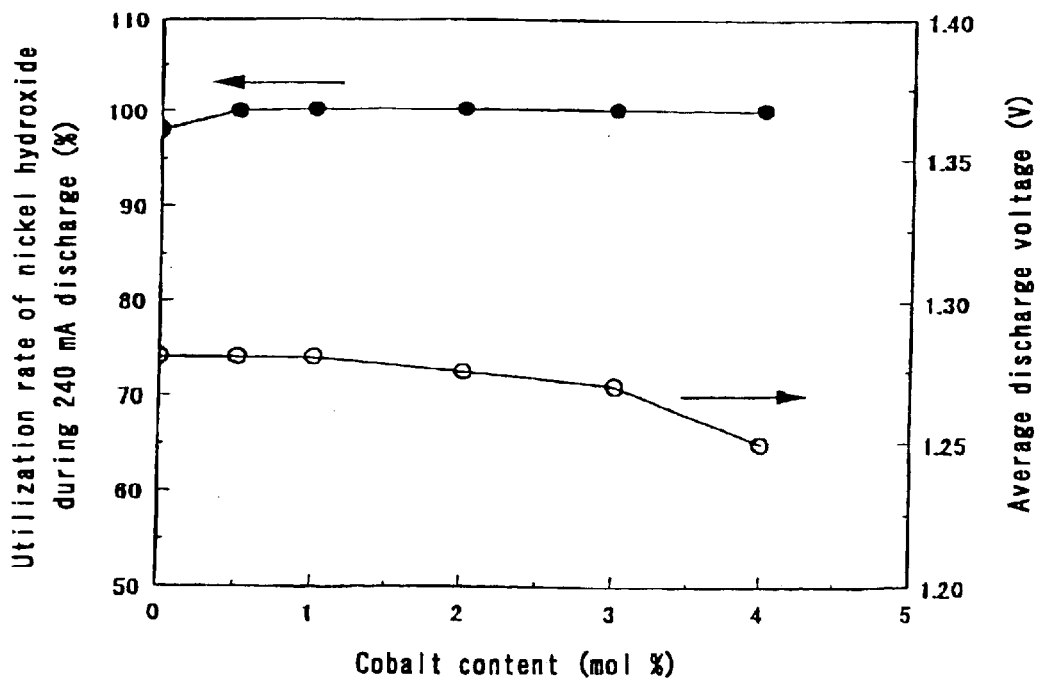
FIG. 5 shows the relationship, obtained in Example 5, between the cobalt content indicated by the ratio of the amount of cobalt to the total amount of nickel, magnesium and cobalt in the nickel hydroxide and the utilization rate of nickel hydroxide during 240 mA discharge or average discharge voltage.

FIG. 5 shows the relationship between the cobalt content indicated by the ratio of the amount of cobalt to the total amount of nickel, magnesium and cobalt and the utilization rate of nickel hydroxide or average discharge voltage.

In FIG. 5, a high utilization rate of nickel hydroxide was obtained when the cobalt content was 0.5 mol % or more. Besides, when the cobalt content was more than 3 mol %, the average discharge voltage was lowered. Accordingly, the appropriate cobalt content is 0.5 to 3 mol %.

A similar tendency was observed for the relationship between the ratio of the amount of manganese to the total amount of nickel, magnesium and manganese and the utilization rate of nickel hydroxide or average discharge voltage. Accordingly, the appropriate manganese content is also 0.5 to 3 mol %.

EXAMPLE 6

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol %.

Thereafter, the same operation as in Example 1 was carried out so as to obtain nickel hydroxide powders in the state of a solid solution with an average particle size of 10 μm.

The obtained nickel hydroxide powder was analyzed, and the following results were obtained.

The ratio of the amount of magnesium to the total amount of nickel and magnesium in the nickel hydroxide was 5 mol %.

The sulfate ion content in the nickel hydroxide was 0.3 wt %.

The powder X-ray diffraction pattern of the nickel hydroxide by CuKα radiation exhibited a β-Ni(OH)$_2$ type single phase pattern.

The half-width of a peak attributed to (101) face near 2θ=37 to 40° in the pattern was 0.8920 The tap density of the nickel hydroxide was all 1.9 g/cm$^3$ or more.

Subsequently, the obtained nickel hydroxide powder was put into an aqueous cobalt sulfate solution and then an aqueous sodium hydroxide solution was gradually added, and they were continuously stirred while making an adjustment to maintain a pH thereof at 12 under 35° C.

As a result, cobalt hydroxide precipitated on the particle surface of the nickel hydroxide. Here, the ratio of the amount of the cobalt hydroxide to the total amount of the nickel hydroxide and cobalt hydroxide was made 10 wt %.

The nickel hydroxide powder having the cobalt hydroxide on its surface was washed with water and then dried under a reduced pressure. The average particle size of the nickel hydroxide powder having the cobalt hydroxide on its surface was 10 μm, and the tap density was 1.95 g/cm$^3$.

Next, the cobalt hydroxide was modified by the following procedure.

An appropriate amount of a 45 wt % aqueous potassium hydroxide solution was added to the nickel hydroxide powder having the cobalt hydroxide on its surface. The resultant nickel hydroxide powder was put into a drier having a heating function by microwaves, and the particles were completely dried under a flow of oxygen. With this operation, the cobalt hydroxide was oxidized and changed to deep blue color. The nickel hydroxide powder having the oxidized cobalt hydroxide on its surface was washed with water and then dried under a reduced pressure.

The average valence number of cobalt was calculated by iodometry, and the result was 3.2. When the cobalt hydroxide was modified using a high-concentration aqueous sodium hydroxide solution instead of the aqueous potassium hydroxide solution, it was also possible to obtain the average valence number of cobalt larger than 3.0.

With the use of the nickel hydroxide powder having the oxidized cobalt hydroxide on its surface as the positive electrode active material, a battery similar to that of Example 1 was fabricated.

A charge/discharge cycle of: charging the obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours and discharged by a current of 3600 mA until the battery voltage reached 1.0 V. Based on the resultant discharge capacity, the utilization rate of nickel hydroxide during 3600 mA high-rate discharge was calculated.

The resultant utilization rate of nickel hydroxide showed a high value of 90%. It should be understood from this that an excellent high-rate discharge characteristic is also obtainable with the use of a nickel hydroxide powder whose surface is coated with a cobalt oxide.

EXAMPLE 7

The same operation as in Example 6 was carried out except that the concentration of potassium hydroxide in the aqueous solution and the heating time in the drier were changed in modifying the cobalt hydroxide, so that nickel hydroxide powders having cobalt oxide on their surface were obtained. With this operation, the cobalt hydroxide was oxidized, but the average valence number of cobalt contained in the obtained cobalt oxides varied around 3.

With the use of the nickel hydroxide powders having cobalt oxides of different oxidized states on their surfaces as the positive electrode active materials, the utilization rate of nickel hydroxide during 3600 mA high-rate discharge was calculated in the same manner as in Example 6.

As a result, it was understood that the high-rate discharge characteristic was degraded when the average valence number of cobalt was smaller than 3. Accordingly, the average valence number of cobalt is preferably larger than 3.

EXAMPLE 8

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol %.

Thereafter, the same operation as in Example 1 was carried out so as to obtain a nickel hydroxide powder in the state of a solid solution with an average particle size of 10 μm.

The obtained nickel hydroxide powder was analyzed, and the following results were obtained.

The ratio of the amount of magnesium to the total amount of nickel and magnesium in the nickel hydroxide was 5 mol %.

The sulfate ion content in the nickel hydroxide was 0.3 wt %.

The powder X-ray diffraction pattern of the nickel hydroxide by CuKα radiation exhibited a β-Ni(OH)$_2$ type single phase pattern.

The half-width of a peak attributed to (101) face near 2θ=37 to 40° in the pattern was 0.892°.

The tap density of the nickel hydroxide was 2.03 g/cm$^3$.

10 g of a cobalt hydroxide powder, 2 g of a Y$_2$O$_3$ powder and 30 g of water were added to 100 g of the obtained nickel hydroxide powder and kneaded to obtain a paste. A nickel foam substrate with a porosity of 95% was filled with this paste, dried and then pressed so as to obtain an electrode plate.

This electrode plate was cut and provided with an electrode lead by spot welding so as to obtain a nickel positive electrode with a theoretical capacity of 1200 mAh. However, the capacity shown here was also calculated by assuming that nickel in the nickel hydroxide makes a one-electron reaction.

Moreover, positive electrodes containing a Yb$_2$O$_3$ powder, a Lu$_2$O$_3$ powder, a TiO$_2$ powder and a CaO powder, respectively, instead of the Y$_2$O$_3$ powder were also fabricated in the same manner.

With the use of the obtained positive electrodes, batteries similar to that of Example 1 were fabricated.

For a comparison, a battery using the positive electrode of Example 1, which had the same structure as the positive electrode of Example 8 except that it did not contain the Y$_2$O$_3$ powder, was also fabricated.

Next, the characteristics of the obtained batteries were evaluated.

A charge/discharge cycle of: charging each battery by a current of 120 mA for 15 hours at 20° C. and discharging it by a current of 240 mA until the battery voltage reached 1.0 V was repeated. Then, after the discharge capacity was stabilized, the average discharge voltage and utilization rate C of nickel hydroxide were calculated. The utilization rate of nickel hydroxide was calculated as the ratio to the theoretical quantity of electricity obtained by assuming that nickel in nickel hydroxide makes a one-electron reaction.

In addition, the battery was charged by a current of 120 mA for 15 hours at 45° C. and discharged by a current of 240 mA at 20° C. until the battery voltage reached 1.0 V. Then, based on the resultant discharge capacity, utilization rate D of nickel hydroxide was calculated.

Table 1 shows the results.

Here, the batteries using the positive electrodes containing Y$_2$O$_3$, Yb$_2$O$_3$, Lu$_2$O$_3$, TiO$_2$ and CaO are indicated as batteries A, B. C, D and E, respectively. Besides, the battery using the positive electrode of Example 1 is shown as battery F.

TABLE 1

| | Utilization rate of nickel hydroxide (%) | | |
|---|---|---|---|
| Battery | C (20° C. charge) | D (45° C. charge) | Average discharge voltage (V) |
| A | 100 | 78 | 1.28 |
| B | 100 | 78 | 1.28 |
| C | 100 | 78 | 1.28 |
| D | 99 | 75 | 1.27 |
| E | 100 | 79 | 1.28 |
| F | 98 | 60 | 1.28 |

It is clear from Table 1 that the charge efficiency of the batteries at a high temperature (45° C.) is significantly improved by using the powder of $Y_2O_3$, $Yb_2O_3$, $Lu_2O_3$, $TiO_2$ or CaO. Moreover, regarding the discharge voltage, since the positive electrode active material of the present invention was used, all the batteries had high values.

It is considered that similar effects would be obtained with the use of an oxide other than $Y_2O_3$, $Yb_2O_3$, $Lu_2O_3$, $TiO_2$ and CaO, or a hydroxide of at least one element selected from the group consisting of Y, Yb, Lu, Ti and Ca. Furthermore, it is considered that similar effects would be obtained with the use of at least two selected from the group consisting of the above-mentioned oxides and hydroxides.

EXAMPLE 9

Positive electrodes and batteries using thereof were fabricated in the same manner as in Example 8 except that the amount of the $Y_2O_3$ powder was changed to 0 to 5 parts by weight per 100 parts by weight of the nickel hydroxide powder.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours at 45° C. and discharged by a current of 240 mA at 20° C. until the battery voltage reached 1.0 V. Then, based on the resultant discharge capacity, utilization rate E of nickel hydroxide was calculated.

In addition, the battery was charged by a current of 120 mA for 15 hours at 20° C. and discharged by a current of 3600 mA at 20° C. until the battery voltage reached 1.0 V. Then, based on the resultant discharge capacity, utilization rate F of nickel hydroxide was calculated.

Figure 6:
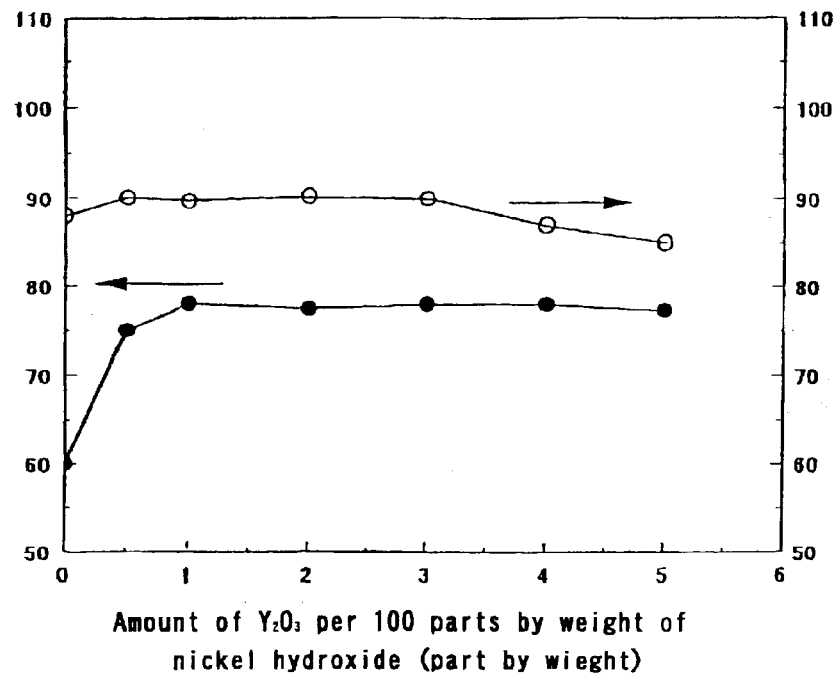
FIG. 6 shows the relationship, obtained in Example 9, between the amount of Y$_2$O$_3$ per 100 parts by weight of nickel hydroxide contained in a positive electrode and utilization rate E of nickel hydroxide during 240 mA discharge after charging at 45° C. or utilization rate F of nickel hydroxide during 3600 mA discharge.

FIG. 6 shows the relationship between the amount (part by weight) of the $Y_2O_3$ powder per 100 parts by weight of the nickel hydroxide powder and the utilization rate E of nickel hydroxide during 240 mA discharge after charging at 45% or utilization rate F of nickel hydroxide during 3600 mA discharge.

In FIG. 6, when the amount of the $Y_2O_3$ powder was 0.5 part by weight or more, a high utilization rate of nickel hydroxide was obtained in the case of charging at a high temperature (45° C.). Moreover, when the amount of the $Y_2O_3$ powder was 3 parts by weight or less, a high utilization rate of nickel hydroxide was obtained during 3600 mA high-rate discharge. Accordingly, in order to improve the charge efficiency at high temperatures and the high-rate discharge characteristic, the amount of the $Y_2O_3$ powder in the positive electrode is preferably 0.5 to 3 parts by weight per 100 parts by weight of the nickel hydroxide powder.

It is considered that, even when $Yb_2O_3$, $Lu_2O_3$, $TiO_2$ or CaO, or a hydroxide of at least one element selected from the group consisting of Y, Yb, Lu, Ti and Ca is used as well as $Y_2O_3$, similar effects would be obtained. Furthermore, it is considered that similar effects would be obtained with the use of at least two selected from the group consisting of the above-mentioned oxides and hydroxides.

EXAMPLE 10

The same operation as in Step 1 of Example 1 was carried out except that the ratio of the amount of magnesium ions to the total amount of nickel ions and magnesium ions in the aqueous solution containing nickel sulfate and magnesium sulfate was made 0.5 to 10 mol %.

Thereafter, the same operation as in Example 1 was carried out so as to obtain nickel hydroxide powders in the state of a solid solution with an average particle size of 10 µm.

The obtained nickel hydroxide powders were analyzed, and the following results were obtained.

The ratios of the amount of magnesium to the total amount of nickel and magnesium in the nickel hydroxides were 0.5 to 10 mol %.

The sulfate ion contents in the nickel hydroxides were 0.3±0.01 wt %.

The powder X-ray diffraction patterns of the nickel hydroxides by CuKα radiation all exhibited a β-Ni(OH)$_2$ type single phase pattern.

The half-widths of a peak attributed to (101) face near 2θ=37 to 40° in the patterns were 0.9±0.02°.

The tap densities of the nickel hydroxides were all 1.9 g/cm$^3$ or more.

With the use of the obtained nickel hydroxide powders with the different magnesium contents as the positive electrode active materials, positive electrodes and batteries using the positive electrodes were fabricated in the same manner as in Example 8.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the average discharge voltage and the utilization rate of nickel hydroxide were calculated.

Figure 7:
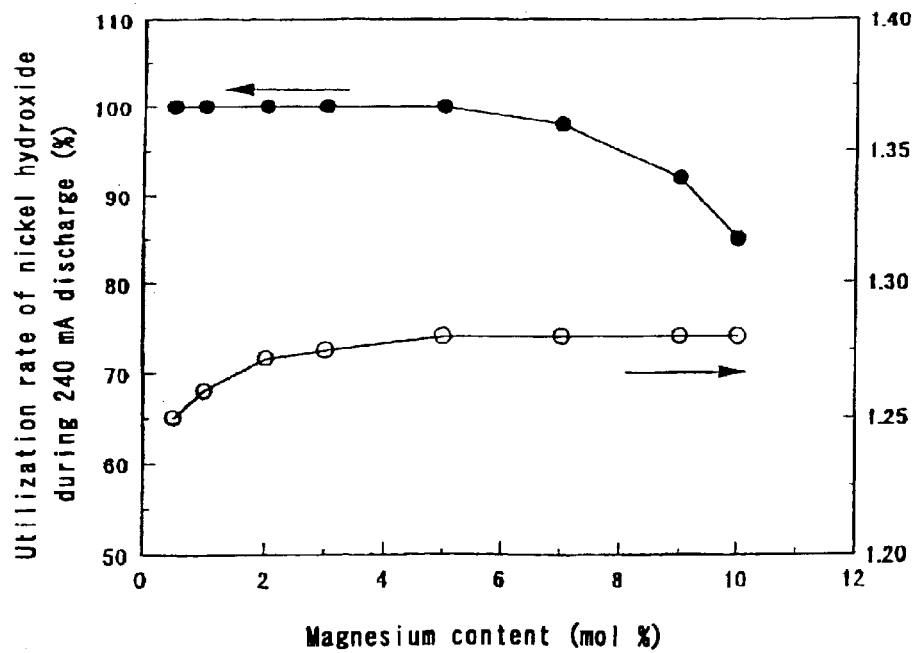
FIG. 7 shows the relationship, obtained in Example 10, between the magnesium content indicated by the ratio of the amount of magnesium to the total amount of nickel and magnesium in the nickel hydroxide and the utilization rate of nickel hydroxide during 240 mA discharge or average discharge voltage.

FIG. 7 shows the relationship between the magnesium content indicated by the ratio of the amount of magnesium to the total amount of nickel and magnesium in the nickel hydroxide and the utilization rate of nickel hydroxide during 240 mA discharge or average discharge voltage.

In FIG. 7, when the magnesium content was 2 mol % or more, the average discharge voltage was increased significantly. Besides, when the magnesium content was larger than 7 mol %, the utilization rate of nickel hydroxide was lowered. Accordingly, the appropriate magnesium content is 2 to 7 mol %.

In addition, since all the batteries contained $Y_2O_3$ in the positive electrodes, they had an excellent charge efficiency at high temperatures like Example 8.

EXAMPLE 11

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol % and the concentration of the aqueous sodium hydroxide solution was made 4.2 to 6 mol/liter.

The pH value in the steady state was between 11 and 12.5 due to the difference in the concentration of the aqueous sodium hydroxide solution.

Thereafter, the same operation as in Example 1 was carried out so as to obtain nickel hydroxide powders in the state of a solid solution with an average particle size of 10 µm.

The obtained nickel hydroxide powders were analyzed, and the following results were obtained.

The ratios of the amount of magnesium to the total amount of nickel and magnesium in the nickel hydroxides were 5 mol %.

The sulfate ion contents in the nickel hydroxides were 0.3±0.01 wt %.

The powder X-ray diffraction patterns of the nickel hydroxides by CuKα radiation all exhibited a $\beta$-Ni(OH)$_2$ type single phase pattern.

The half-widths of a peak attributed to (101) face near 2θ=37 to 40° in the patterns were 0.63 to 1.31°.

The tap densities of the nickel hydroxides were all 1.9 g/cm$^3$ or more.

With the use of the obtained nickel hydroxide powders with the different half-widths as the positive electrode active materials, positive electrodes and batteries using the positive electrodes were fabricated in the same manner as in Example 8.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, utilization rate G of nickel hydroxide was calculated.

In addition, a charge/discharge cycle of: charging the battery by a current of 120 mA for 15 hours and discharging it by a current of 3600 mA until the battery voltage reached 1.0 V was repeated. Then, after the discharge capacity was stabilized, utilization rate H of nickel hydroxide was calculated.

Figure 8:
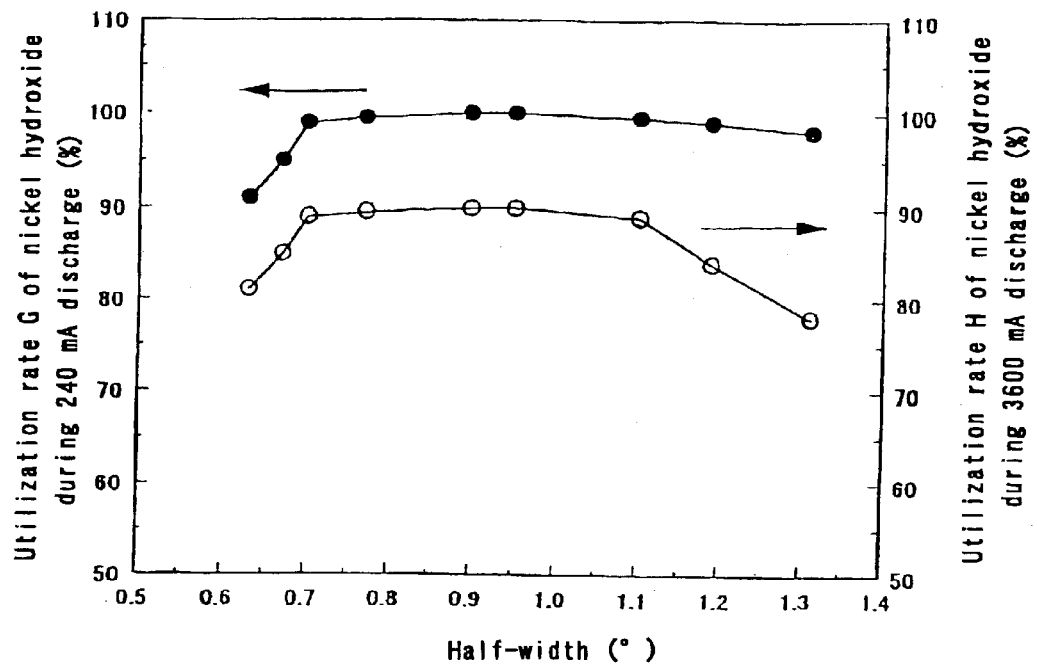
FIG. 8 shows the relationship, obtained in Example 11, between the half-width of a peak attributed to (101) face near 2θ=37 to 40° in a powder X-ray diffraction pattern of the nickel hydroxide by CuKα ray radiation and utilization rate G of nickel hydroxide during 240 mA discharge or utilization rate H of nickel hydroxide during 3600 mA discharge.

FIG. 8 shows the relationship between the half-width of a peak attributed to (101) face and utilization rate G of nickel hydroxide during 240 mA discharge or utilization rate H of nickel hydroxide during 3600 mA discharge.

In FIG. 8, when the half-width was 0.7 or more, a high utilization rate of nickel hydroxide was obtained during 240 mA low-rate discharge. Moreover, when the half-width was 1.2° or less, a high utilization rate of nickel hydroxide was obtained during 3600 mA high-rate discharge. Accordingly, in order to improve the utilization rate of nickel hydroxide and high-rate discharge characteristic, it is effective to control the half-width to be 0.7 to 1.2°.

In addition, since all the batteries contained Y$_2$O$_3$ in the positive electrodes, they had an excellent charge efficiency at high temperatures like Example 8.

EXAMPLE 12

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol %.

Moreover, the same operation as in Step 2 of Example 1 was carried out except that the time and the number of repetition of the alkali treatment were changed, so that nickel hydroxide powders in the state of a solid solution with an average particle size of 10 µm were obtained. By changing the time and the number of repetition of the alkali treatment, it is possible to change the sulfate ion content in the hydroxide.

The obtained nickel hydroxide powders were analyzed, and the following results were obtained.

The ratios of the amount of magnesium to the total amount of nickel and magnesium in the nickel hydroxides were 5 mol %.

The sulfate ion contents in the nickel hydroxides were 0.05 to 1.0 wt %.

The powder X-ray diffraction patterns of the nickel hydroxides by CuKα radiation all exhibited a $\beta$-Ni(OH)$_2$ type single phase pattern.

The half-widths of a peak attributed to (101) face near 2θ=37 to 40° in the patterns were 0.9±0.1°.

The tap densities of the nickel hydroxides were all 1.9 g/cm$^3$ or more.

With the use of the obtained nickel hydroxide powders with the different sulfate ion contents as the positive electrode active materials, positive electrodes and batteries using the positive electrodes were fabricated in the same manner as in Example 8.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours and discharged by a current of 3600 mA until the battery voltage reached 1.0 V. Based on the resultant discharged capacity, the utilization rate of nickel hydroxide during 3600 mA high-rate discharge was calculated.

Figure 9:
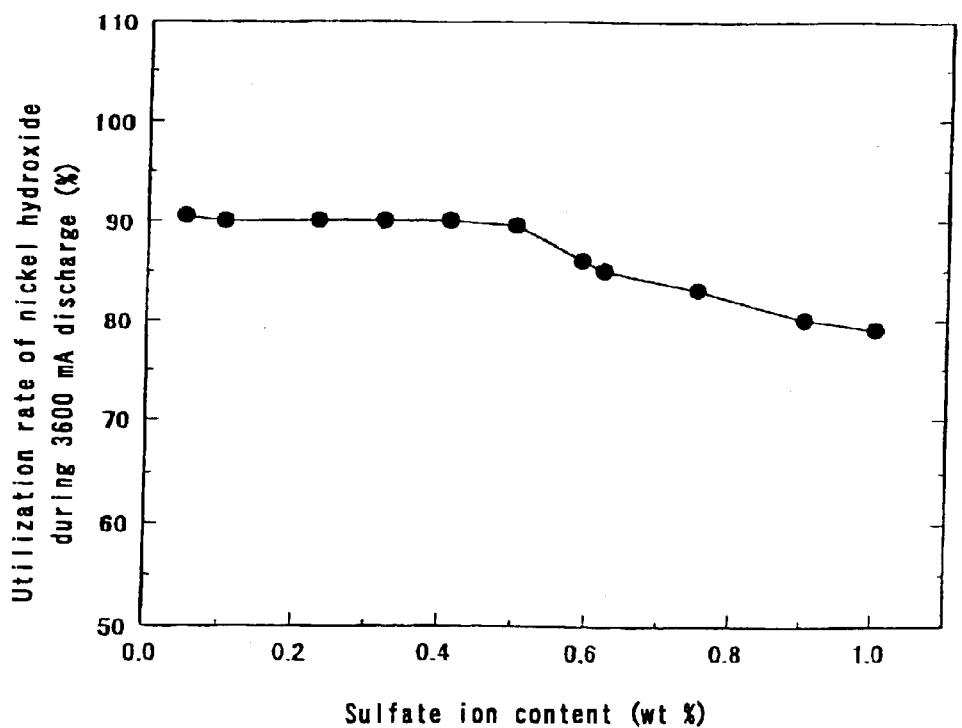
FIG. 9 shows the relationship, obtained in Example 12, between the sulfate ion content in nickel hydroxide and the utilization rate of the nickel hydroxide during 3600 mA discharge.

FIG. 9 shows the relationship between the sulfate ion content in the nickel hydroxide and the utilization rate of nickel hydroxide during 3600 mA high-rate discharge.

In FIG. 9, when the sulfate ion content was 0.5 wt % or less, a high utilization rate was obtained during high-rate discharge. In contrast, when the sulfate ion content was more than 0.5 wt %, the utilization rate of nickel hydroxide was abruptly lowered. Accordingly, in order to improve the high-rate discharge characteristic, it is extremely important to make the sulfate ion content in the crystal of the nickel hydroxide 0.5 wt % or less.

In addition, since all the batteries contained Y$_2$O$_3$ in the positive electrodes, they had an excellent charge efficiency at high temperatures like Example 8.

EXAMPLE 13

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol % and the temperature in the reaction apparatus was changed to 20 to 70° C. By changing the temperature in the reaction apparatus, it is possible to change the orientation of the crystals of the hydroxide.

Thereafter, by performing the same operation as in Example 1, nickel hydroxide powders in the state of a solid solution with an average particle size of 10 µm were obtained.

The obtained nickel hydroxide powders were analyzed, and the following results were obtained.

The ratios of the amount of magnesium to the total amount of nickel and magnesium in the nickel hydroxides were 5 mol %.

The sulfate ion contents in the nickel hydroxides were 0.3±0.01 wt %.

The powder X-ray diffraction patterns of the nickel hydroxides by CuKα radiation all exhibited a β-Ni(OH)$_2$ type single phase pattern.

The half-widths of a peak attributed to (101) face near 2θ=37 to 40° in the patterns were 0.9±0.1°.

The ratios of intensity B of a peak attributed to (001) face near 2θ=18 to 21° to intensity A of a peak attributed to (101) face near 2θ=37 to 40° in the patterns: B/A were 1.0 to 1.3.

The tap densities of the nickel hydroxides were all 1.9 g/cm$^3$ or more.

With the use of the obtained nickel hydroxide powders with the different peak intensity ratios B/A as the positive electrode active materials, positive electrodes and batteries using the positive electrodes were fabricated in the same manner as in Example 8.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, utilization rate A of nickel hydroxide was calculated.

Moreover, the battery was charged by a current of 120 mA for 15 hours and discharged by a current of 3600 mA until the battery voltage reached 1.0 V. Based on the resultant discharge capacity, the utilization rate of nickel hydroxide during 3600 mA high-rate discharge was calculated.

Figure 10:
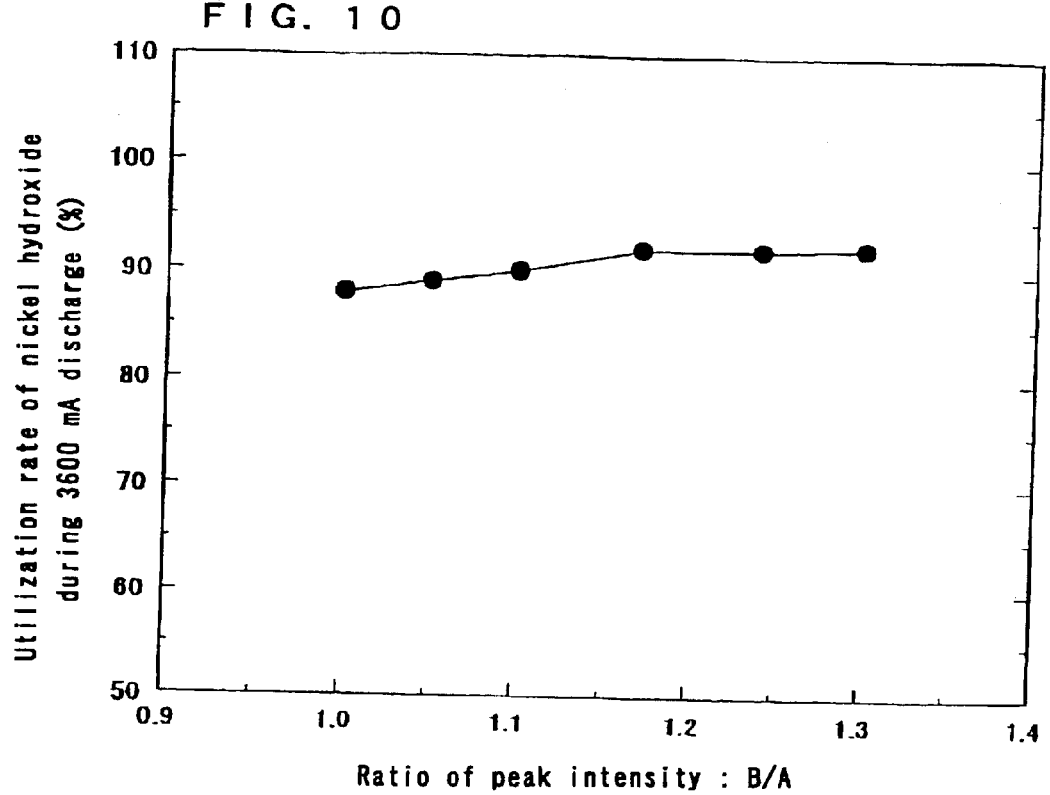
FIG. 10 shows the relationship, obtained in Example 13, between the ratio of intensity B of a peak attributed to (001) face near 2θ=18 to 21° to intensity A of a peak attributed to (101) face near 2θ=37 to 40° in a powder X-ray diffraction pattern of the nickel hydroxide by CuKα ray radiation: B/A and the utilization rate of nickel hydroxide during 3600 mA discharge.

FIG. 10 shows the relationship between the peak intensity ratio B/A and the utilization rate of nickel hydroxide during 3600 mA high-rate discharge.

In FIG. 10, when the value of B/A was 1.1 or more, a high utilization rate of nickel hydroxide was obtained during high-rate discharge. Accordingly, in order to achieve a further improvement of the high-rate discharge characteristic, it is effective to control the peak intensity ratio B/A to be 1.1 or more.

In addition, since all the batteries contained Y$_2$O$_3$ in the positive electrodes, they had an excellent charge efficiency at high temperatures like Example 8.

EXAMPLE 14

The same operation as in Step 1 of Example 1 was carried out except that the ratio of the amount of magnesium ions to the total amount of nickel ions and magnesium ions in the aqueous solution containing nickel sulfate and magnesium sulfate was made 5 mol %.

Thereafter, by performing the same operation as in Example 1, a nickel hydroxide powder in the state of a solid solution with an average particle size of 10 μm was obtained.

The obtained nickel hydroxide powder was analyzed, and the following results were obtained.

The ratio of the amount of magnesium to the total amount of nickel and magnesium in the nickel hydroxide was 5 mol %.

The sulfate ion content in the nickel hydroxide was 0.3 wt %.

The powder X-ray diffraction pattern of the nickel hydroxide by CuKα radiation exhibited a β-Ni(OH)$_2$ type single phase pattern.

The half-width of a peak attributed to (101) face near 2θ=37 to 40° in the pattern was 0.892°.

The tap density of the nickel hydroxide was 2.03 g/cm$^3$.

Subsequently, the obtained nickel hydroxide powder was put into an aqueous cobalt sulfate solution and then an aqueous sodium hydroxide solution was gradually added, and they were continuously stirred while making an adjustment to maintain a pH thereof at 12 under 35° C.

As a result, cobalt hydroxide precipitated on the particle surface of the nickel hydroxide. Here, the ratio of the amount of the cobalt hydroxide to the total amount of the nickel hydroxide and cobalt hydroxide was made 10 wt %.

The nickel hydroxide powder having the cobalt hydroxide on its surface was washed with water and then dried under a reduced pressure. The average particle size of this powder was 10 μm, and the tap density was 1.9 g/cm$^3$.

Next, the cobalt hydroxide was modified by the following procedure.

An appropriate amount of a 45 wt % aqueous potassium hydroxide solution was added to the nickel hydroxide powder having the cobalt hydroxide on its surface. The resultant nickel hydroxide powder was put into a drier having a heating function by microwaves, and the particles were completely dried under a flow of oxygen. With this operation, the cobalt hydroxide was oxidized and changed to deep blue color. The nickel hydroxide powder having the oxidized cobalt hydroxide on its surface was washed with water and then dried under a reduced pressure.

The average valence number of cobalt calculated by iodometry was 3.2.

With the use of the nickel hydroxide powders having oxidized cobalt hydroxide on their surface as the positive electrode active materials, positive electrodes and batteries using the positive electrodes were fabricated in the same manner as in Example 8.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours and discharged by a current of 3600 mA until the battery voltage reached 1.0 V. Based on the resultant discharge capacity, the utilization rate of nickel hydroxide during the 3600 mA high-rate discharge was calculated.

As a result, the utilization rate of nickel hydroxide showed a high value of 90%. It should be understood from this that an excellent high-rate discharge characteristic is also obtainable with the use of an active material whose surface is coated with a cobalt oxide.

In addition, since all the batteries contained Y$_2$O$_3$ in the positive electrodes, they had an excellent charge efficiency at high temperatures like Example 8.

EXAMPLE 15

Nickel hydroxide powders having an oxide of cobalt on their surfaces were obtained by performing the same operation as in Example 14 except that the concentration of potassium hydroxide in the aqueous solution and the heating time in the drier were changed in modifying the cobalt hydroxide. With this operation, the cobalt hydroxide was oxidized, but the average valence number of cobalt contained therein varied around 3.

With the use of the nickel hydroxide powders having the obtained cobalt oxides with different average valence numbers of cobalt on their surface as the positive electrode active materials, the utilization rate of nickel hydroxide during 3600 mA high-rate discharge was calculated in the same manner as in Example 14.

As a result, it was understood that the high-rate discharge characteristic was degraded when the average valence number of cobalt was smaller than 3. Accordingly, the average valence number of cobalt is preferably larger than 3.

EXAMPLE 16

A battery G was fabricated in the same manner as in Example 8 except that the $Y_2O_3$ powder was not added to the positive electrode and a mixed solution of a 5 mol/liter aqueous potassium hydroxide solution and a 2 mol/liter aqueous sodium hydroxide solution was used as the electrolyte.

Next, the characteristic of the battery G and the characteristic of the battery F used in Example 8 were compared. Only the difference between the batteries G and F was the composition of the electrolyte.

A charge/discharge cycle of: charging each battery by a current of 120 mA for 15 hours at 20° C. and discharging it by a current of 240 mA until the battery voltage reached 1.0 V was repeated. Then, after the discharge capacity was stabilized, the average discharge voltage and utilization rate I of nickel hydroxide were calculated.

Next, each battery was charged by a current of 120 mA for 15 hours at 45° C. and discharged by a current of 240 mA at 20° C. until the battery voltage reached 1.0 V. Then, utilization rate J of nickel hydroxide was calculated from the discharge capacity. The results are shown in Table 2.

TABLE 2

| Battery | Utilization rate of nickel hydroxide (%) | | Average discharge voltage (V) |
|---|---|---|---|
| | I (20° C. charge) | J (45° C. charge) | |
| G | 98 | 78 | 1.28 |
| F | 98 | 60 | 1.28 |

It is clear from Table 2 that the charge efficiency at high temperatures is significantly improved by the electrolyte containing the sodium hydroxide.

Here, although the active material synthesized in Example 8 was used, even if active materials synthesized in Examples 10 through 15 are used, the charge efficiency at high temperatures would be significantly improved by using an electrolyte containing sodium hydroxide.

EXAMPLE 17

Batteries were fabricated in the same manner as in Example 16 except that the concentration of sodium hydroxide in the electrolyte were made 0 to 7 mol/liter. At this time, the sodium hydroxide was added to the electrolyte so that the total concentration of sodium hydroxide and potassium hydroxide was 7 mol/liter.

A charge/discharge cycle of: charging each obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours at 45° C. and discharged by a current of 240 mA at 20° C. until the battery voltage reached 1.0 V. Then, utilization rate K of nickel hydroxide was calculated from the resultant discharge capacity.

Next, the battery was charged by a current of 120 mA for 15 hours at 20° C. and discharged by a current of 3600 mA at 20° C. until the battery voltage reached 1.0 V. Then, utilization rate L of nickel hydroxide was calculated from the resultant discharge capacity.

Figure 11:
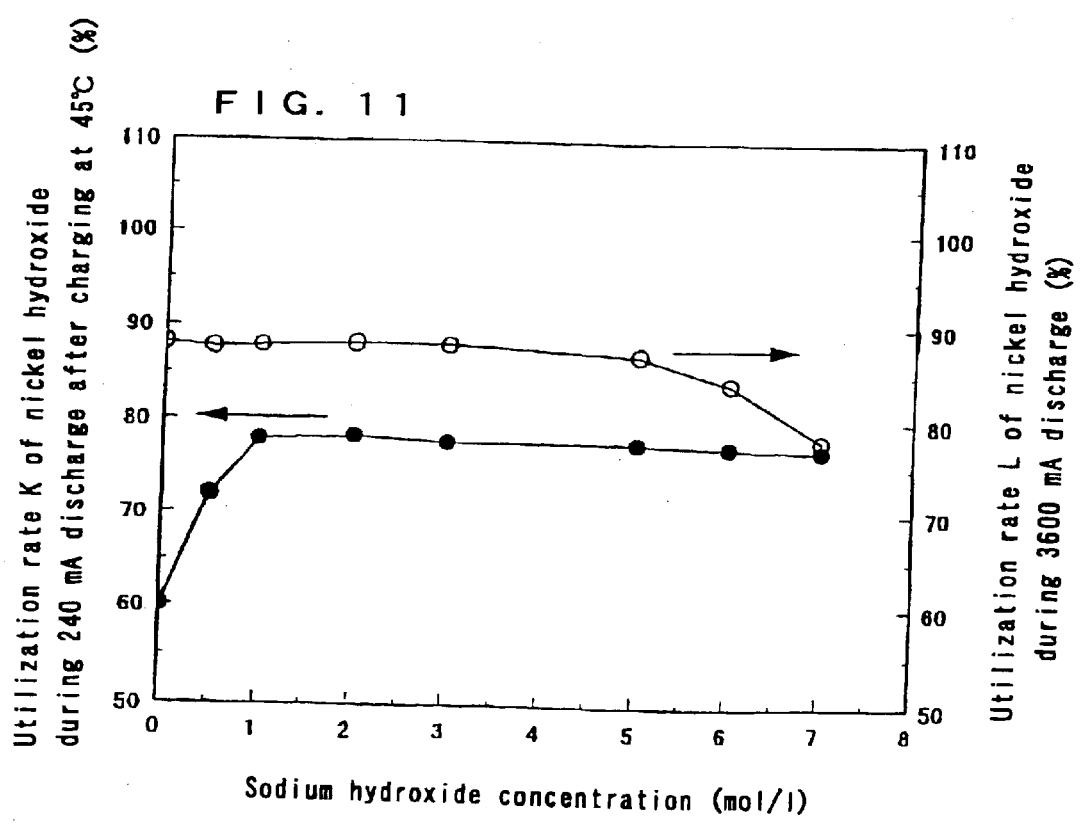
FIG. 11 shows the relationship, obtained in Example 17, between the sodium hydroxide concentration in an electrolyte and utilization rate K of nickel hydroxide during 240 mA discharge after charging at 45° C. or utilization rate L of nickel hydroxide during 3600 mA discharge.

FIG. 11 shows the relationship between the sodium hydroxide concentration in the electrolyte and utilization rate K of nickel hydroxide during 240 mA discharge after charging at 45° C. or utilization rate L of nickel hydroxide during 3600 mA discharge.

In FIG. 11, a high utilization rate of nickel hydroxide was obtained in the case of charging at high temperatures when the sodium hydroxide concentration was 1 mol/liter or more, and a high utilization rate of nickel hydroxide was obtained during high-rate discharge when the concentration was 5 mol/liter or less. Accordingly, in order to increase the charge efficiency at high temperatures and high-rate discharge characteristic, the sodium hydroxide concentration in the electrolyte is preferably 1 to 5 mol/liter.

EXAMPLE 18

A battery was fabricated in the same manner as in Example 8 except that a mixed solution of a 5 mol/liter aqueous potassium hydroxide solution and a 2 mol/liter aqueous sodium hydroxide solution was used as the electrolyte.

A charge/discharge cycle of: charging the obtained battery by a current of 120 mA for 15 hours at 20° C. and discharging it by a current of 240 mA until the battery voltage reached 1.0 V was repeated. Then, after the discharge capacity was stabilized, the battery was charged by a current of 120 mA for 15 hours at 45° C. and discharged by a current of 240 mA at 20° C. until the battery voltage reached 1.0 V. Then, the utilization rate of nickel hydroxide was calculated from the resultant discharge capacity.

In addition, the battery was charged by a current of 120 mA for 15 hours at 20° C. and discharged by a current of 3600 mA at 20° C. until the battery voltage reached 1.0 V. Then, the utilization rate of nickel hydroxide was calculated from the resultant discharge capacity.

As a result, when the battery was charged at 45° C., the utilization rate of nickel hydroxide was 80%, and thus a significant improvement of the charge efficiency at high temperatures was recognized. Further, the utilization rate of nickel hydroxide during 3600 mA high-rate discharge was 90%, and an excellent high-rate discharge characteristic was also obtained.

It is considered that, even when $Yb_2O_3$, $Lu_2O_3$, $TiO_2$ or CaO, or a hydroxide of at least one element selected from the group consisting of Y, Yb, Lu, Ti and Ca, are used as well as $Y_2O_3$, similar effects would be obtained. Furthermore, it is considered that similar effects would be obtained with the use of at least two selected from the group consisting of the above-mentioned oxides and hydroxides.

As described above, by making the positive electrode contain a positive electrode active material of the present invention and a predetermined oxide and making the electrolyte contain sodium hydroxide, it is possible to obtain a battery having an excellent high-rate discharge characteristic and excellent charge efficiency at high temperatures.

INDUSTRIAL APPLICABILITY

According to the present invention, it is possible to provide a positive electrode active material capable of producing alkaline storage batteries having a high discharge voltage and excellent high-rate discharge characteristic and also provide a positive electrode and alkaline storage battery containing thereof.

What is claimed is:

1. A positive electrode for an alkaline storage battery comprising an active material comprising a nickel hydroxide powder,
wherein said nickel hydroxide is a solid solution containing magnesium,
a magnesium content in said nickel hydroxide is 2 to 7 mol % of all metallic elements contained in said nickel hydroxide,
a tap density of said nickel hydroxide is 1.9 g/cm$^3$ or more,
a half-width of a peak attributed to (101) face near 2θ=37 to 40° in a powder X-ray diffraction pattern of said nickel hydroxide by CuK α radiation is 0.7 to 1.2°,
a ratio of intensity B of a peak in said powder X-ray diffraction pattern attributed to (001) face near 2θ=18 to 21° to intensity A of said peak attributed to (101) face near 2θ=37 to 40°: B/A is 1.1 or more, and
a sulfate ion content in said nickel hydroxide is 0.5 wt % or less;
further containing 0.5 to 3 parts by weight of a powder comprising an oxide of at least one element selected from the group consisting of Y, Yb, Lu, Ti and Ca per 100 parts by weight of said active material.

2. The positive electrode for an alkaline storage battery in accordance with claim 1, wherein said nickel hydroxide is a solid solution further containing at least one element selected from the group consisting of cobalt and manganese.

3. The positive electrode for an alkaline storage battery in accordance with claim 2, wherein an amount of said at least one element selected from the group consisting of cobalt and manganese, contained in said nickel hydroxide, is 0.5 to 3 mol % of all metallic elements contained in said nickel hydroxide.

4. The positive electrode active material for an alkaline storage battery in accordance with claim 1, wherein the surface of said nickel hydroxide is coated with an oxide of cobalt.

5. The positive electrode active material for an alkaline storage battery in accordance with claim 4, wherein an average valence number of cobalt contained in said oxide of cobalt is larger than 3.

6. An alkaline storage battery comprising the positive electrode in accordance with claim 1, a negative electrode and an alkaline electrolyte.

7. The alkaline storage battery in accordance with claim 6, wherein said alkaline electrolyte contains sodium hydroxide.

8. The alkaline storage battery in accordance with claim 7, wherein the concentration of said sodium hydroxide in said alkaline electrolyte is 1 to 5 mol/liter.

* * * * *